Dec. 13, 1927.
G. PIEL, JR
1,652,794
DISTANCE CONTROL FOR MOVABLE PARTS
Original Filed May 28, 1924
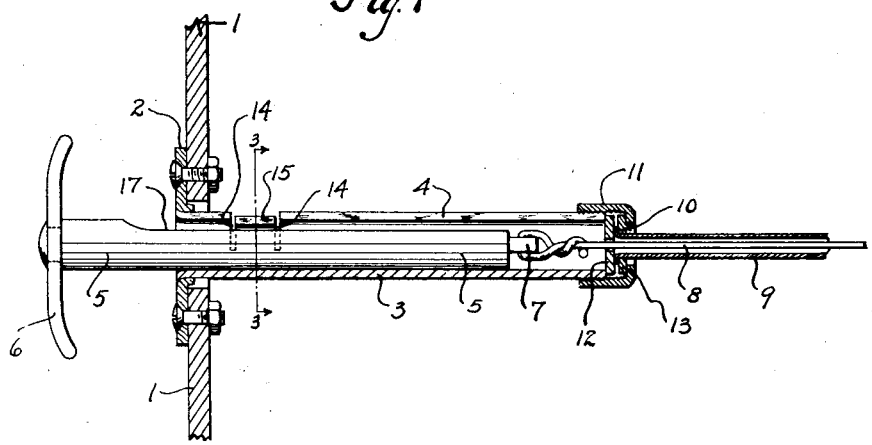
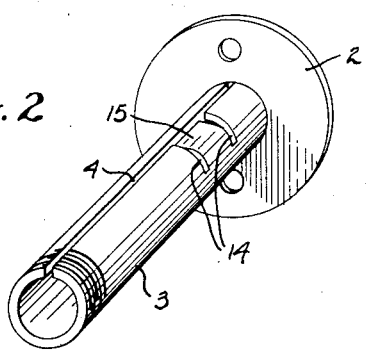
INVENTOR
Gottfried Piel Jr
BY
ATTORNEY Patented Dec. 13, 1927.

1,652,794

UNITED STATES PATENT OFFICE.

GOTTFRIED PIEL, JR., OF FOREST HILLS, NEW YORK, ASSIGNOR TO STEINER ELECTRIC CORPORATION, OF LONG ISLAND CITY, NEW YORK, A CORPORATION OF NEW YORK.

DISTANCE CONTROL FOR MOVABLE PARTS.

Application filed May 28, 1924, Serial No. 716,362. Renewed July 12, 1927.

This invention relates to means for controlling the operation of a movable mechanism at a point removed from the operator and relates more particularly to an instrument board control for automobiles, whereby the driver may operate a valve, such as a cutout valve, located underneath the car body.

The invention consists broadly in providing a stationary member of housing which may be mounted upon the instrument board or dashboard to receive a movable member that will interlock with the housing to hold the valve or other mechanism in its adjusted position merely by turning such movable member with relation to the stationary member.

The invention also consists in providing a simple, compact and efficient device that may be mounted easily upon the instrument board or dashboard of an automobile without requiring nice adjustment with respect to the board or to the actuated mechanism or adjustment of the parts of the device to each other.

Various other objects and advantages of the invention will be more fully set forth in the following particular description of one form of mechanism embodying my invention, and the invention also consists in certain new and novel features of construction and combination of parts hereinafter set forth and claimed.

In the accompanying drawings:—

Figure 1 is a side elevation partly in section of one form of apparatus embodying my invention.

Figure 2 is a detail view on an enlarged scale of the locking means.

Figure 3 is a cross-section showing the locking means.

Figure 4 is a cross-section showing the locking means in a locked position.

Referring to the drawings, the stationary member is permanently mounted on the instrument board or dashboard 1 of an automobile and comprises a flange or extension 2 which may be secured to the instrument board in any suitable location and a housing or bearing 3 which projects beyond the instrument board inside the cowl. This housing is preferably tubular in section and may be made of spring steel or other suitable material formed into a tube and preferably is split lengthwise by a longitudinal slot 4 to permit a limited expansion of the tube. The housing receives a movable plunger 5 provided at its outer end with a suitable knob or handle 6 preferably ornamented to conform with the other fittings on the dashboard and provided at its inner end with an eye 7 or other means whereby a flexible wire may be secured thereto. The wire 8 may be of any preferred type to form a flexible actuating connection with a movable mechanism such as a valve (not shown) and extends from the plunger to such valve or other moving part through a tube 9 which closely confines the wire yet permits longitudinal movement thereof in the usual well-known manner. Preferably the flared end 10 of the tube is secured to the housing between the washers by means of the removable cap nut 11 having a central opening therethrough which permits passage of the tube and wire. The washer 12 seats against the end of the housing and has a central passage therethrough of sufficient diameter to fit snugly around the wire and forms a guide therefor. The washer 13 has a central opening or hole of sufficient diameter to pass the tube and seats against the nut 11 which is threaded upon the housing and locks the tube in place between the washers.

At a convenient point in the housing two cuts 14 are made transverse to the longitudinal slot and spaced a suitable distance apart to provide a spring lip or section 15. Said spring lip at the end thereof adjacent to the longitudinal slot in the housing is flattened slightly as indicated at 16 in Figure 3. The plunger is cylindrical and has a segment cut away for a portion of its length sufficient to accommodate all possible positions of the movable mechanism under control and also to compensate for adjustment. A shoulder is thus formed between the face 17 on the plunger and the circular portion thereof. The plunger has approximately the same radius as the housing and seats snugly but without accurate fitting. The flat face 17 of the plunger is normally opposite the flattened end of the spring portion 15 of the bearing or housing.

In operation the end of the wire (not shown) is attached to a movable mechanism such for example as a cutout valve on an automobile. When the valve is in its closed and inoperative position permitting the gases of combustion from the engine to pass through the muffler, the plunger is seated within the housing 3 so that the flat portion thereof is adjacent the spring portion 15 of the housing, thus permitting longitudinal sliding movement of the plunger with little friction. When it is desired to operate the valve however, then the knob or handle on the plunger is pulled away from the instrument board which exerts a pull on the wire thereby opening the valve. After the valve has been opened to the desired extent the knob or handle is rotated which brings the shoulder formed by cutting away a segment of the plunger into engagement with the spring lip and further rotation of the knob or shoulder causes the shoulder to cam the spring lip outward and the segmental portion of the plunger to engage with the circular portion of the housing thereby locking the plunger in its adjusted position with a locking frictional contact. To release the valve and cause same to return to its normal closed position it is only necessary to rotate the knob or handle in the opposite direction restoring the flat face of the plunger to a position opposite the locking end of the spring lip thereby permitting the plunger to slide freely in the housing and the valve to be closed by an inward movement of the knob or handle toward the dashboard.

By means of this construction a moving part such as a cut-out valve on an automobile can be operated from the instrument board although the valve is located at a considerable distance from the driver and entirely out of line with the control device. The movable actuating plunger may be locked in position either at the full end of its movement in either direction or at any intermediate point. The locking is effected merely by rotating the handle of the plunger without any auxiliary parts or attachments of any kind. The plunger is the only movable portion of the control device. The device is easy to assemble and attach. In case the wire is a little too long or too short it will be compensated by regulating the lengthwise movement of the plunger rod. Therefore accurate fitting and installation of the device in order that the plunger may be locked in a predetermined position is avoided.

Having thus described my invention I claim:

1. In a control apparatus for actuating a valve on an automobile from the instrument board or dashboard the combination of a housing secured to the instrument board or dashboard, said housing being tubular in section with a longitudinal slot lengthwise thereof, and having a spring section formed by transverse slots, a plunger having means whereby said plunger is freely movable lengthwise of the housing, in one position and engaging the spring section in any other position to lock the plunger against lengthwise movement.

2. A control device for a movable member placed at a distance therefrom the combination with a housing having a locking spring thereon, of a plunger having a flattened portion and operatively connected with said movable member and freely slidable lengthwise of the housing when said flattened portion is opposite said spring, said plunger being provided with a portion engaging with the spring when the plunger is rotated thereby to lock the same, means for rotating the plunger and a connecting device between said member and the plunger.

3. In a control device for a movable member placed at a distance therefrom the combination with a housing having a flattened spring section integral therewith, of a plunger mounted in said housing and movable therein, said plunger comprising a portion movable relative to the spring without interlocking therewith and a portion to interlock with said spring and means connected to the plunger for actuating said movable member.

4. A control apparatus comprising a stationary housing tubular in section and having an integral resilient lip with a flattened free end intermediate its length, and a plunger having a flat portion and a circular portion movable in said housing, said plunger being freely movable lengthwise when the flat portion is opposite said lip and being locked against movement when the circular portion is opposite said lip.

5. In a device for moving a mechanism at a distance, the combination with a movable mechanism of a cylindrical plunger connected with said movable mechanism, said plunger having a segment removed therefrom, a means for rotating said plunger and a tubular bearing for the plunger having a slot lengthwise thereof and two spaced cuts transverse to said slot to form a spring lip, said lip permitting sliding movement of the plunger, in one position and locking said plunger against movement in any other position.

6. In a device for moving a mechanism at a distance, the combination with a movable mechanism, of a cylindrical plunger having a segment removed therefrom, to provide a flat face, means for rotating said plunger, a tubular bearing for the plunger having a slot lengthwise thereof and two spaced cuts transverse to said slot to form a spring lip, said lip being flattened at its free end thereby to permit unrestricted sliding movement of the plunger when its flat face is opposite the spring lip, and to lock said plunger against movement in any other position, a wire connecting the plunger and said movable mechanism a tube secured to the housing and endorsing a portion of the wire said tube having flared edges and washers seated between the end of the housing and a cap threaded on the housing and pressing the flared end of the tube between them.

Signed at Long Island City, N. Y. in the county of Queens and State of New York this 20th day of May A. D. 1924.

GOTTFRIED PIEL, Jr.